United States Patent [19]
Min et al.

[11] Patent Number: 5,774,256
[45] Date of Patent: Jun. 30, 1998

[54] METHOD FOR MANUFACTURING AN ARRAY OF THIN FILM ACTUATED MIRRORS

[75] Inventors: Yong-Ki Min; Myung-Kwon Koo; Jae-Hyuk Chung, all of Seoul, Rep. of Korea

[73] Assignee: Daewoo Electronics Co., Ltd., Seoul, Rep. of Korea

[21] Appl. No.: 571,567

[22] Filed: Dec. 13, 1995

[30] Foreign Application Priority Data

Dec. 19, 1994 [KR] Rep. of Korea ...................... 94-34973
Dec. 19, 1994 [KR] Rep. of Korea ...................... 94-34975

[51] Int. Cl.⁶ .................................................. G02B 26/00
[52] U.S. Cl. ........................ 359/291; 359/223; 359/850; 359/900
[58] Field of Search ................................... 359/290, 291, 359/292, 900, 846, 850, 855, 223, 224

[56] References Cited

U.S. PATENT DOCUMENTS 5,172,262 12/1992 Hornbeck ................................. 359/223

Primary Examiner—Georgia Y. Epps
Assistant Examiner—Dawn-Marie Bey
Attorney, Agent, or Firm—Anderson Kill & Olick, P.C.

[57] ABSTRACT

A method for manufacturing an array of M×N thin film actuated mirrors includes the steps of: providing an active matrix; forming a thin film sacrificial layer; creating an array of empty slots with sharp edges in the thin film sacrificial layer; rounding off the sharp edges; forming supporting members; depositing an elastic layer; forming conduits; forming a second thin film layer; depositing a thin film electrodisplacive layer; patterning the thin film electrodisplacive and the second thin film layers into an array of thin film electrodisplacive members and second thin film electrodes; depositing an insulating layer; patterning the insulating and the elastic layers into an array of insulating and elastic members; removing the thin film sacrificial layer, thereby providing driving spaces; forming a photoresist layer, the photoresist also filling the driving spaces; removing the photoresist layer and the insulating members formed on top of each of the thin film electrodisplacive members; and forming a first thin film electrode on top of each of the thin film electrodisplacive members thereby forming the array of M×N thin film actuated mirrors.

15 Claims, 11 Drawing Sheets

METHOD FOR MANUFACTURING AN ARRAY OF THIN FILM ACTUATED MIRRORS

FIELD OF THE INVENTION

The present invention relates to an optical projection system; and, more particularly, to a method for manufacturing an array of M×N thin film actuated mirrors for use therein.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

The process for manufacturing the array 100 begins with the preparation of an active matrix 10, having a top surface and comprising a substrate 12, an array of M×N transistors (not shown) and an array of M×N connecting terminals 14.

In a subsequent step, there is formed on the top surface of the active matrix 10 a thin film sacrificial layer 28 by using a sputtering or an evaporation method if the thin film sacrificial layer 28 is made of a metal, a chemical vapor deposition(CVD) or a spin coating method if the thin film sacrificial layer 28 is made of a phosphor-silicate glass (PSG), or a CVD method if the thin film sacrificial layer 28 is made of a poly-Si.

Thereafter, there is formed a supporting layer 20 including an array of M×N supporting members 24 surrounded by the thin film sacrificial layer 28, wherein the supporting layer 20 is formed by: creating an array of M×N empty slots(not shown) in the thin film sacrificial layer 28 by using a photolithography method, each of the empty slots being located around the connecting terminals 14; and forming a supporting member 24 in each of the empty slots by using a sputtering or a CVD method, as shown in FIG. 1A. The supporting members 24 are made of an insulating material.

In a following step, an elastic layer 60 made of an insulating material is formed on top of the supporting layer 20 by using a Sol-Gel, a sputtering or a CVD method.

Thereafter, a conduit 22 made of a metal is formed in each of the supporting members 24 by: first creating an array of M×N holes(not shown), each of the holes extending from top of the elastic layer 60 to top of the connecting terminals 14, by using an etching method; and filling therein with the metal thereby forming the conduit 22, as shown in FIG. 1B.

In a next step, a second thin film layer 40 made of an electrically conducting material is formed on top of the elastic layer 60 including the conduits 22 by using a sputtering method. The second thin film layer 40 is electrically connected to the transistors through the conduits 22 formed in the supporting members 24.

Then, a thin film electrodisplacive layer 70 made of a piezoelectric or an electrostrictive material is formed on top of the second thin film layer 40 by using a Sol-Gel, a sputtering or a CVD method, as shown in FIG. 1C.

In an ensuing step, the thin film electrodisplacive layer 70, the second thin film layer 40 and the elastic layer 60 are patterned into an array of M×N thin film electrodisplacive members 75, an array of M×N second thin film electrodes 45 and an array of M×N elastic members 65 by using a photolithography or a laser trimming method until top of the supporting layer 20 is exposed, as shown in FIG. 1D. Each of the second thin film electrodes 45 is connected electrically to the transistor through the conduit 22 formed in each of the supporting members 24 and functions as a signal electrode in the thin film actuated mirrors 101.

Next, each of the thin film electrodisplacive members 75 is heat treated to allow a phase transition to take place to thereby form an array of M×N heat treated structures(not shown). Since each of the thin film electrodisplacive members 75 is sufficiently thin, there is no need to pole it in case it is made of a piezoelectric material: for it can be poled with the electric signal applied during the operation of the thin film actuated mirrors 101.

After the above step, an array of M×N first thin film electrodes 35 made of an electrically conducting and light reflecting material is formed on top of the thin film electrodisplacive members 75 in the array of M×N heat treated structures by first forming a layer 88, made of the electrically conducting and light reflecting material, completely covering top of the array of M×N heat treated structures, including the exposed supporting layer 20, using a sputtering method, as shown in FIG. 1E, and then selectively removing the layer 88, using an etching method, resulting in an array 110 of M×N actuated mirror structures 111, wherein each of the actuated mirror structures 111 includes a top surface and four side surfaces, as shown in FIG. 1F. Each of the first thin film electrodes 35 functions as a mirror as well as a bias electrode in the thin film actuated mirrors 101.

The preceeding step is then followed by completely covering the top surface and the four side surfaces in each of the actuated mirror structures 111 with a thin film protection layer(not shown).

The thin film sacrificial layer 28 in the supporting layer 20 is then removed by using an etching method. Finally, the thin film protection layer is removed by using an etching method to thereby form the array 100 of M×N thin film actuated mirrors 101, as shown in FIG. 1G.

There are a number of problems associated with the above described method for manufacturing the array 100 of M×N thin film actuated mirrors 101. The first and foremost is that an etchant or a chemical used in the removal of the thin film sacrificial layer 28 might chemically attack the thin film layers constituting the thin film actuated mirrors 101, degrading the structural integrity and the performance of the thin film actuated mirrors 101, which may, in turn, compromise the overall performance of the array 100.

In addition, during the removal of the thin film protection layer, an etchant or a chemical used therein might also chemically attack the thin film layers constituting the thin film actuated mirrors 101, which may further adversely affect the overall performance of the array 100.

SUMMARY OF THE INVENTION

It is, therefore, a primary object of the present invention to provide a method for manufacturing an array of M×N thin film actuated mirrors for use in an optical projection system which minimizes the possibility of chemical attacks on the thin film layers constituting each of the thin film actuated mirrors during the removal of the thin film sacrificial layer.

It is another object of the present invention to provide a method for manufacturing an array of M×N thin film actuated mirrors for use in an optical projection system which dispenses with the formation of the thin film protection layer.

In accordance with one aspect of the present invention, there is provided a method for manufacturing an array of M×N thin film actuated mirrors, wherein M and N are integers, for use in an optical projection system, and each of the thin film actuated mirrors has an unimorph structure, the method comprising the steps of: providing an active matrix including an array of connecting terminals on a top surface thereof, a substrate and an array of transistors; forming a thin film sacrificial layer on the top surface of the active matrix in such a way that the thin film sacrificial layer completely covers the array of the connecting terminals; creating an array of empty slots in the thin film sacrificial layer, wherein each of the empty slots is located around the connecting terminals, and the creation of the empty slots gives rise to sharp edges at a boundary between the thin film sacrificial layer and the empty slots; rounding off the sharp edges; forming a supporting member in each of the empty slots by filling therein with a first insulating material; depositing an elastic layer, made of the same material as the supporting member, on top of the supporting members and the thin film sacrificial layer; forming an appropriate number of conduits, each of the conduits extending from top of the elastic layer, passing through the supporting member, to top of a corresponding connecting terminal; forming a second thin film layer made of an electrically conducting material on top of the elastic layer and the conduits; depositing a thin film electrodisplacive layer on top of the second thin film layer; patterning the thin film electrodisplacive layer and the second thin film layer, respectively, into an array of M×N thin film electrodisplacive members and second thin film electrodes so that each of the thin film electrodisplacive members and the second thin film electrodes is formed on top of the supporting members with the elastic layer intervening therebetween, wherein each of the thin film electrodisplacive members and the second thin film electrodes has side surfaces; depositing an insulating layer, made of a second insulating material, on top of each of the thin film electrodisplacive members and the elastic layer including the side surfaces of each of the thin film electrodisplacive members and the second thin film electrodes; patterning the insulating and the elastic layers, respectively, into an array of insulating and elastic members until the thin film sacrificial layer is exposed; removing the thin film sacrificial layer to thereby form an array of M×N semifinished actuators, wherein each of the semifinished actuators is provided with a driving space; forming a photoresist layer on top of the array of M×N semifinished actuators, the photoresist filling in completely the driving spaces thereof; removing portions of the photoresist layer and the insulating member formed on top of the thin film electrodisplacive member in each of the semifinished actuators; removing portions of the photoresist layer on top of each of the insulating members and the photoresist filling in the driving spaces, to thereby form an array of M×N semifinished actuated mirrors; and forming a first thin film electrode made of an electrically conducting and light reflecting material on top of each of the semifinished actuated mirrors to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1A:
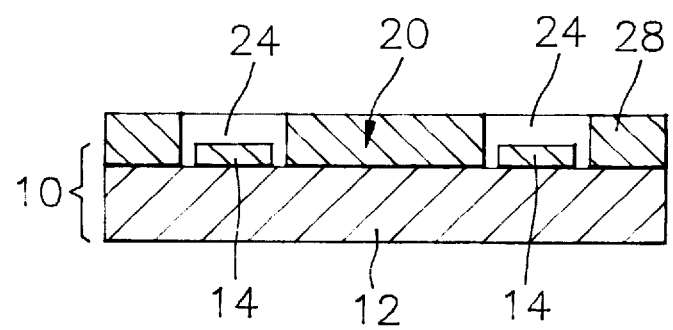
FIGS. 1A to 1G illustrate schematic cross sectional views setting forth manufacturing steps for an array of M×N thin film actuated mirrors previously disclosed.
Figure 1B:
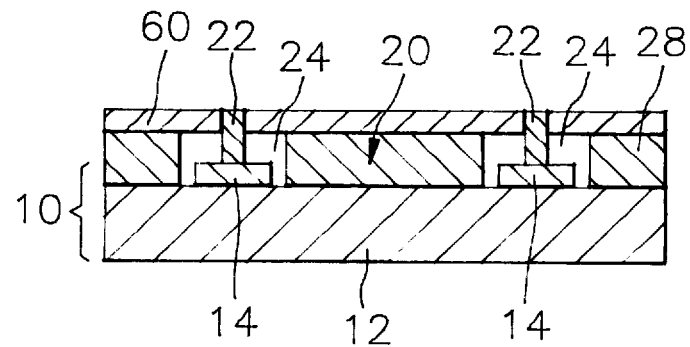
Figure 1C:
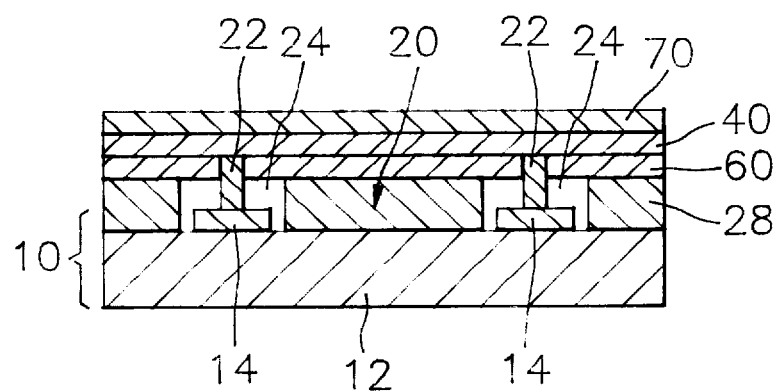
Figure 1D:
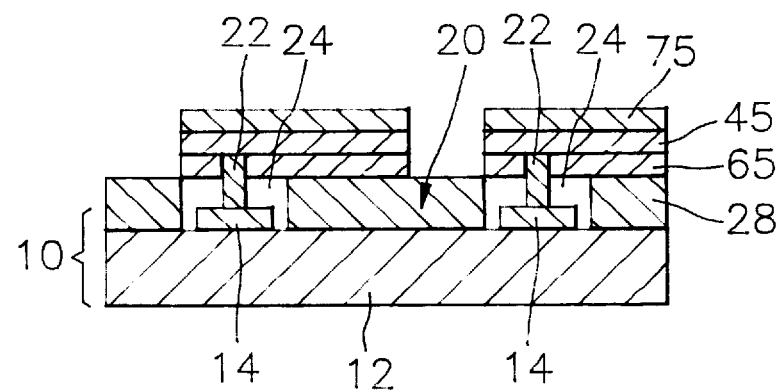
Figure 1E:
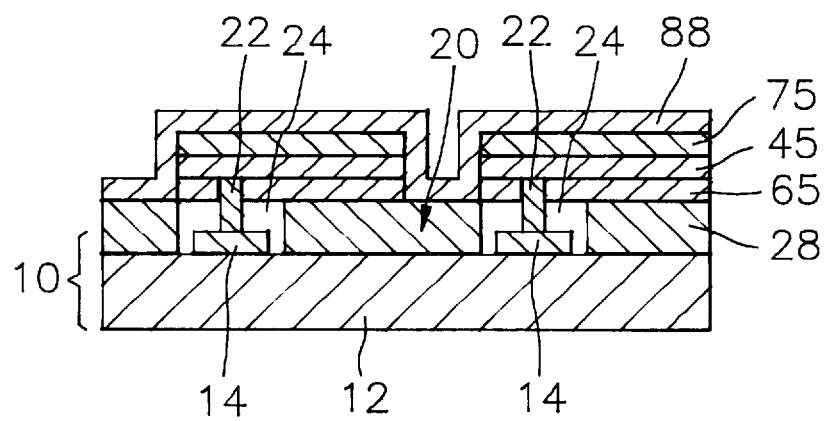
Figure 1F:
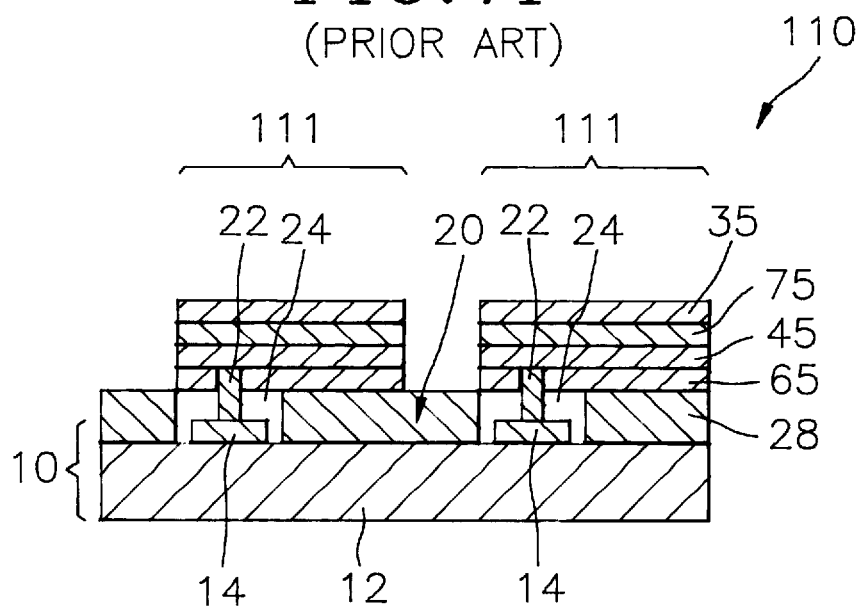
Figure 1G:
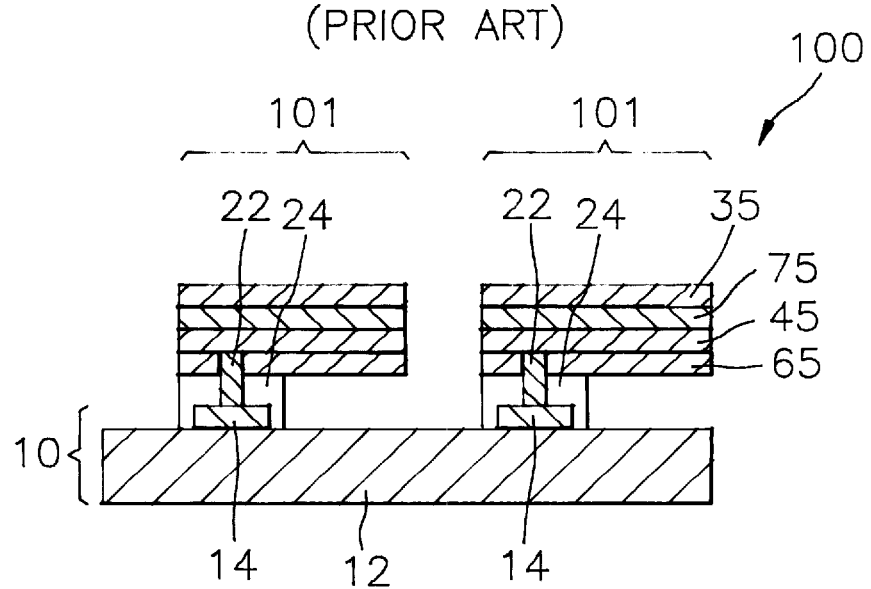

Referring now to FIGS. 2A to 2J and 3A to 3B, there are provided schematic cross sectional views setting forth a method for manufacturing an array of M×N thin film actuated mirrors for use in an optical projection system, wherein M and N are integers, in accordance with preferred embodiments of the present invention. It should be noted that like parts appearing in FIGS. 2A to 2J and 3A to 3B are represented by like reference numerals.

In FIGS. 2A to 2J, there are provided schematic cross sectional views explaining a method for manufacturing an array 200 of M×N thin film actuated mirrors 201 in accordance with an embodiment of the present invention, wherein each of the thin film actuated mirrors 201 has an unimorph structure, comprising one electrodisplacive member placed between two electrodes.

The process for manufacturing the array 200 begins with the preparation of an active matrix 210, having a top surface and including an array of 2M×N connecting terminals 214 on the top surface thereof, a substrate 212 and an array of M×N transistors(not shown).

In a subsequent step, there is formed on the top surface of the active matrix 210 a thin film sacrificial layer 226, having a thickness of 1–2 μm, and made of a metal, e.g., copper(Cu) or nickel(Ni), a phosphor-silicate glass(PSG) or a poly-Si, in such a way that the thin film sacrificial layer 226 completely covers the array of the connecting terminals 214. The thin film sacrificial layer 226 is formed by using a sputtering or an evaporation method if the thin film sacrificial layer 226 is made of a metal, a chemical vapor deposition(CVD) method or a spin coating method if the thin film sacrificial layer 226 is made of a PSG, and a CVD method if the thin film sacrificial layer 226 is made of a poly-Si.

Thereafter, there is formed an array of 2M×N empty slots 220 in the thin film sacrificial layer 226 by using a photolithography method, wherein each of the empty slots 220 is located around the connecting terminals 214. As a result, there are sharp edges at the boundaries between the remaining thin film sacrificial layer 214 and the empty slots 220.

Figure 2A:
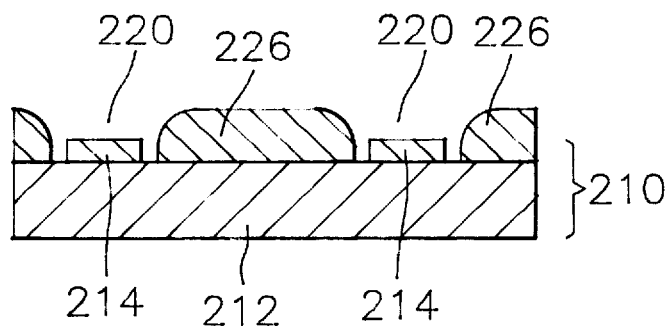
FIGS. 2A to 2J provide schematic cross sectional views explaining a method for manufacturing an array of M×N thin film actuated mirrors in accordance with an embodiment of the present invention.

In a following step, the sharp edges are rounded off by using a conventional rapid thermal annealing(RTA) method, as shown in FIG. 2A. The RTA method comprises the steps of: raising the temperature by 45°–55° C./sec. in a nitrogen gas atmosphere until a desired temperature is attained, the desired temperature being in a range from 1000° C. to 1500° C.; holding the temperature for 30–60 seconds; and lowering the temperature by 100°–150° C. min.

Figure 2B:
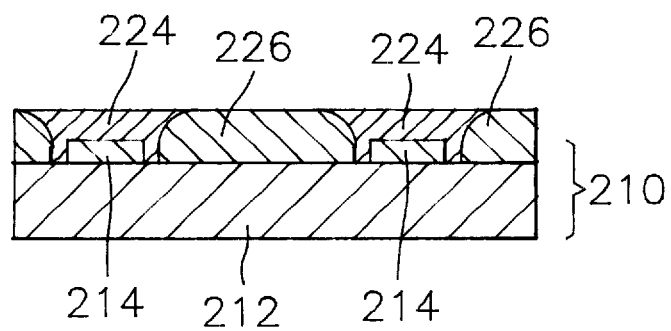

Subsequently, each of the empty slots 220 is filled with a first insulating material by using a sputtering or a CVD method, thereby forming a supporting member 224 in each of the empty slots 220, as shown in FIG. 2B.

In an ensuing step, an elastic layer 260, made of the same material as the supporting members 224, i.e., the first insulating material, and having a thickness of 0.1–2 µm, is formed on top of the thin film sacrificial layer 226 and the supporting members 224 by using a Sol-Gel, a sputtering or a CVD method.

Figure 2C:
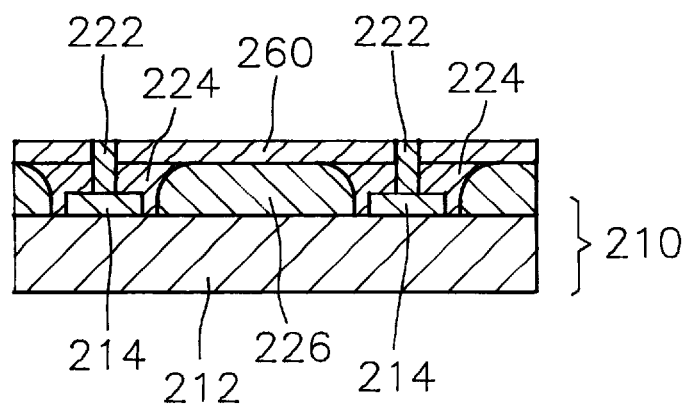

Thereafter, there are formed 2M×N number of conduits 222 made of a metal, e.g., tungsten(W). Each of the conduits 222 is formed by: first creating an array of 2M×N holes(not shown), wherein each of the holes extends from top of the elastic layer 260, passes through the supporting member 224, to top of a corresponding connecting terminal 214 by using an etching method; and filling therein with the metal by using a CVD method, as shown in FIG. 2C.

In a subsequent step, a second thin film layer(not shown), made of an electrically conducting material, e.g., platinum (Pt) or platinum/titanium(Pt/Ti), and having a thickness of 0.1–2 µm, is formed on top of the elastic layer 260 and the conduits 222 by using a sputtering or a vacuum evaporation method.

Next, a thin film electrodisplacive layer(not shown), made of a piezoelectric material, e.g., lead zirconium titanate (PZT), or an electrostrictive material, e.g., lead magnesium niobate(PMN), and having a thickness of 0.1–2 µm, is formed on top of the second thin film layer by using a Sol-Gel method, a CVD method or a sputtering method. The thin film electrodisplacive layer is then heat treated to allow a phase transition to take place.

Figure 2D:
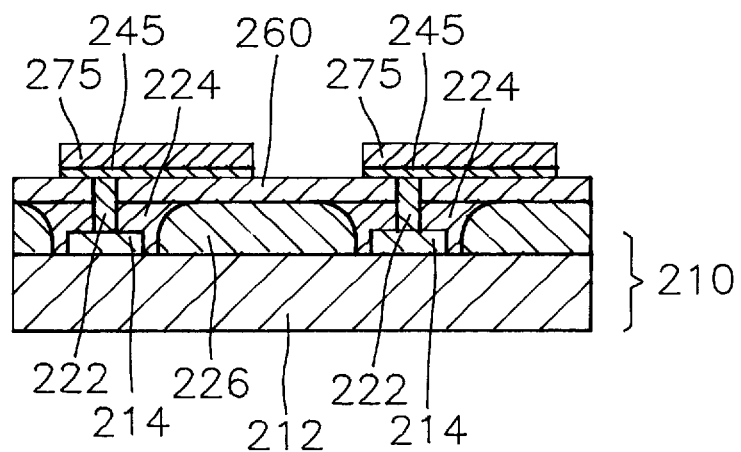

In a following step, the thin film electrodisplacive and the second thin film layers are, respectively, patterned into an array of M×N thin film electrodisplacive members 275 and second thin film electrodes 245 so that each of the thin film electrodisplacive members 275 and the second thin film electrodes 245 is formed on top of the supporting members 224, with the elastic layer 260 intervening therebetween, by using a photolithography or a laser trimming method, wherein each of the thin film electrodisplacive members 275 and the second thin film electrodes 245 has side surfaces, as shown in FIG. 2D. Each of the second thin film electrodes 245 is electrically connected to a corresponding connecting terminal 214 through the conduit 222 and functions as a signal electrode in the thin film actuated mirror 201. Since each of the thin film electrodisplacive members 275 is sufficiently thin, there is no need to pole it in case it is made of a piezoelectric material: for it can be poled with the electric signal applied during the operation of the thin film actuated mirrors 201. The heat treatment for forcing the phase transition can also take place after the formation of the array of M×N thin film electrodisplacive members 275.

Figure 2E:
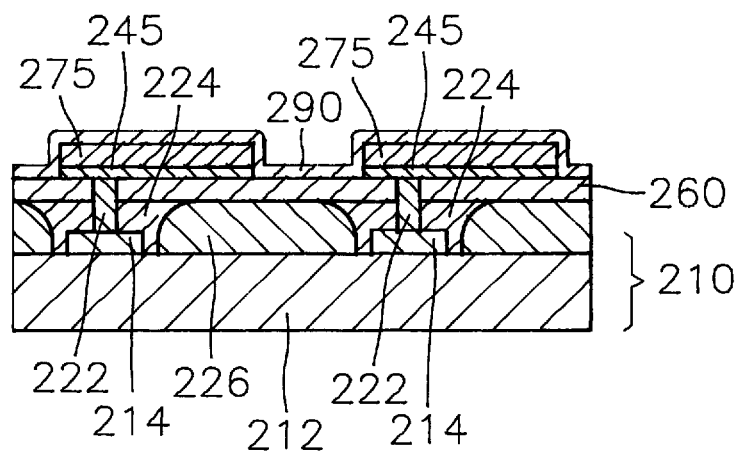

In a subsequent step, as shown in FIG. 2E, an insulating layer 290, made of a second insulating material, e.g., silicon nitride, and having a thickness of 0.1–2 µm, is formed on top of each of the thin film electrodisplacive members 275 and the elastic layer 260 including the side surfaces of each of the thin film electrodisplacive members 275 and the second thin film electrodes 245 by using a sputtering or a CVD method.

Figure 2F:
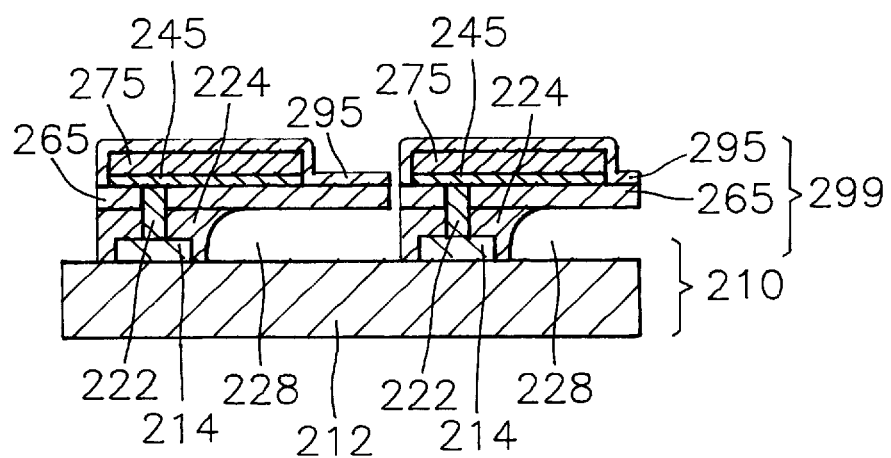

Thereafter, the insulating and the elastic layers 290, 260 are, respectively, patterned into an array of M×N insulating and elastic members 295, 265, until the thin film sacrificial layer 226 is exposed, by using a dry etching method or an wet etching method. The thin film sacrificial layer 226 is then removed by using an wet etching method, employing an etchant, e.g., hydrogen fluoride(HF), to thereby form an array of M×N semifinished actuators 299, wherein each of the semifinished actuators 299 is provided with a driving space 228, as shown in FIG. 2F.

Figure 2G:
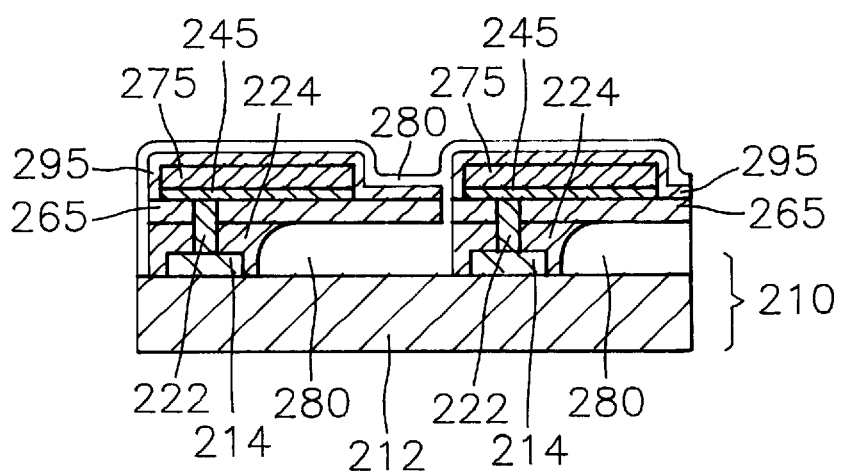

In an ensuing step, as shown in FIG. 2G, there is formed a photoresist layer 280, made of a polymer, and having a thickness of 1–2 µm, formed on top of the semifinished actuators 299 by using a spin coating method, the photoresist also filling in completely the driving spaces 228.

Figure 2H:
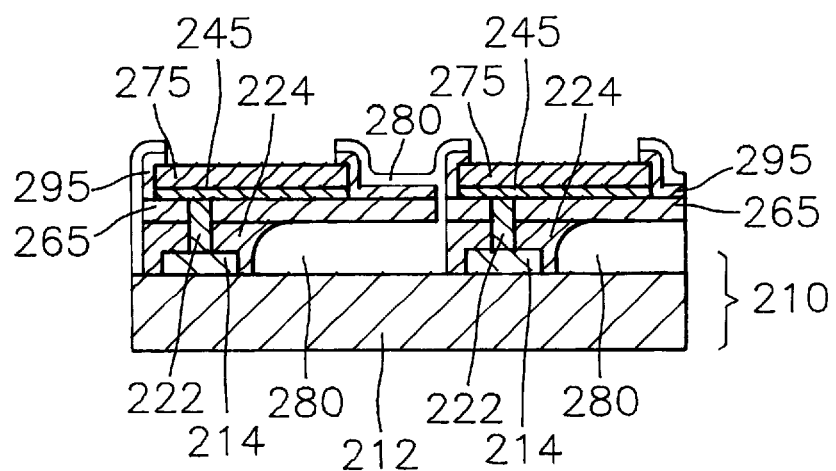
Figure 2I:
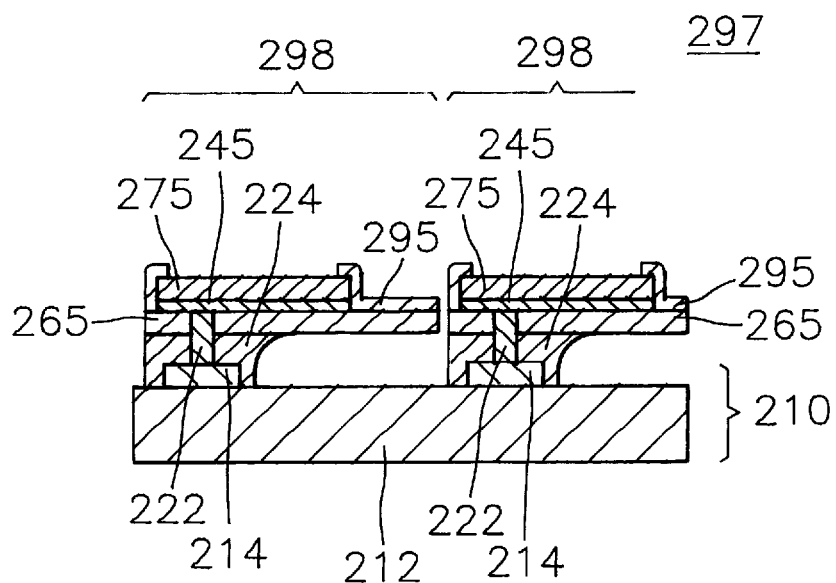

Subsequently, portions of the photoresist layer 280 and the insulating member 295 formed on top of each of the semifinished actuators 299 are removed by using a photolithography method, until the thin film electrodisplacive member 275 in each of the semifinished actuators 299 is exposed, as shown in FIG. 2H. The remaining portions of the photoresist layer 280 on top of the remaining portions of the insulating member 295 in each of the semifinished actuators 299 and the photoresist filling in the driving spaces 228 are subsequently removed by using a plasma etching method, to thereby form an array 297 of M×N semifinished actuated mirrors 298, as shown in FIG. 2I.

Figure 2J:
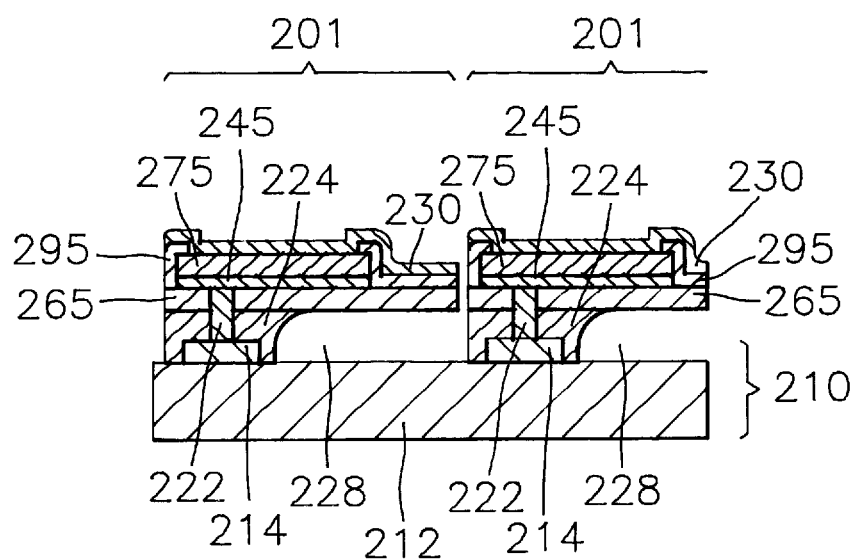

Finally, a first thin film electrode 230, made of an electrically conducting and light reflecting material, e.g., aluminum(Al) or silver(Ag), and having a thickness of 0.1–2 µm, is formed on top of each of the semifinished actuated mirrors 298 by using a sputtering or a vacuum evaporation method, thereby forming the array 200 of M×N thin film actuated mirrors 201, as shown in FIG. 2J. The first thin film electrode 230 formed on top of each of the semifinished actuated mirrors 298 functions as a mirror as well as a bias electrode in the thin film actuated mirrors 201.

Figure 3A:
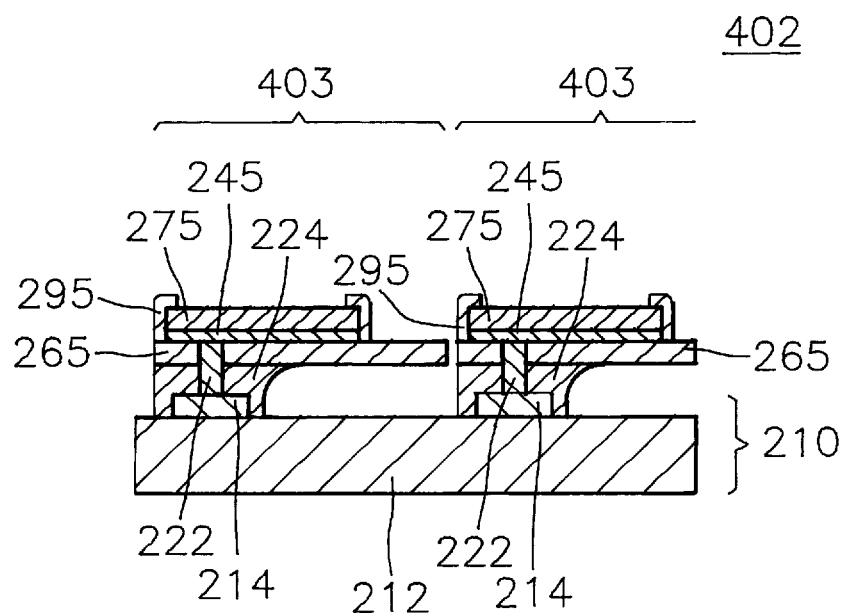
FIGS. 3A to 3B represent schematic cross sectional views illustrating a method for manufacturing an array of M×N thin film actuated mirrors in accordance with another embodiment of the present invention.
Figure 3B:
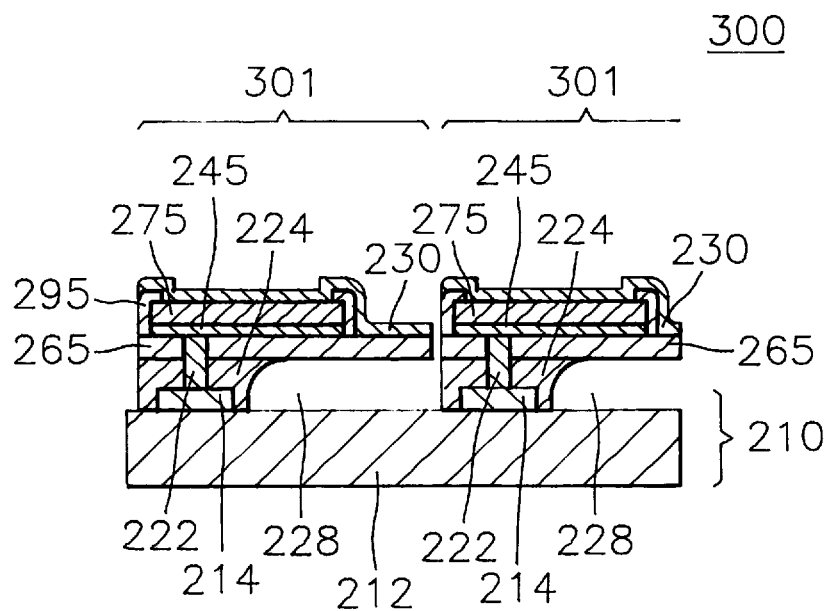

In FIGS. 3A to 3B, there are presented schematic cross sectional views illustrating a method for manufacturing an array 300 of M×N thin film actuated mirrors 301 in accordance with another embodiment of the present invention.

After the step of removing portions of the photoresist layer 280 and the insulating members 295 formed on top of each of the semifinished actuators 299 until the thin film electrodisplacive member 275 therein is exposed, as shown in FIG. 2H, the remaining portions of the photoresist layer 280 on top of the remaining portions of the insulating member 295 in each of the semifinished actuators 299 and the photoresist filling in the driving spaces 228 are subsequently removed.

Portions of the insulating member 295 formed on top of the elastic member 265 in each of the semifinished actuators 299 are further removed by using a photolithography method, to thereby form an array 402 of M×N semifinished actuated mirrors 403, as shown in FIG. 3A.

In a subsequent step, a first thin film electrode 230, made of an electrically conducting and light reflecting material, is formed on top of each of the semifinished actuated mirrors 403, thereby forming an array 300 of M×N thin film actuated mirrors 301, as shown in FIG. 3B.

It should be mentioned that, even though, each of the thin film actuated mirrors 201, 301 prepared using the inventive method has an unimorph structure, the inventive method can be equally well applied to the manufacturing an array of thin film actuated mirrors, each of the thin film actuated mirrors having a bimorph structure, for the latter case just involves formation of additional electrodisplacive and electrode layers.

It should be further noted that the inventive method can be modified to allow a manufacturing an array of thin film actuated mirrors having a different geometry.

Figure 4:
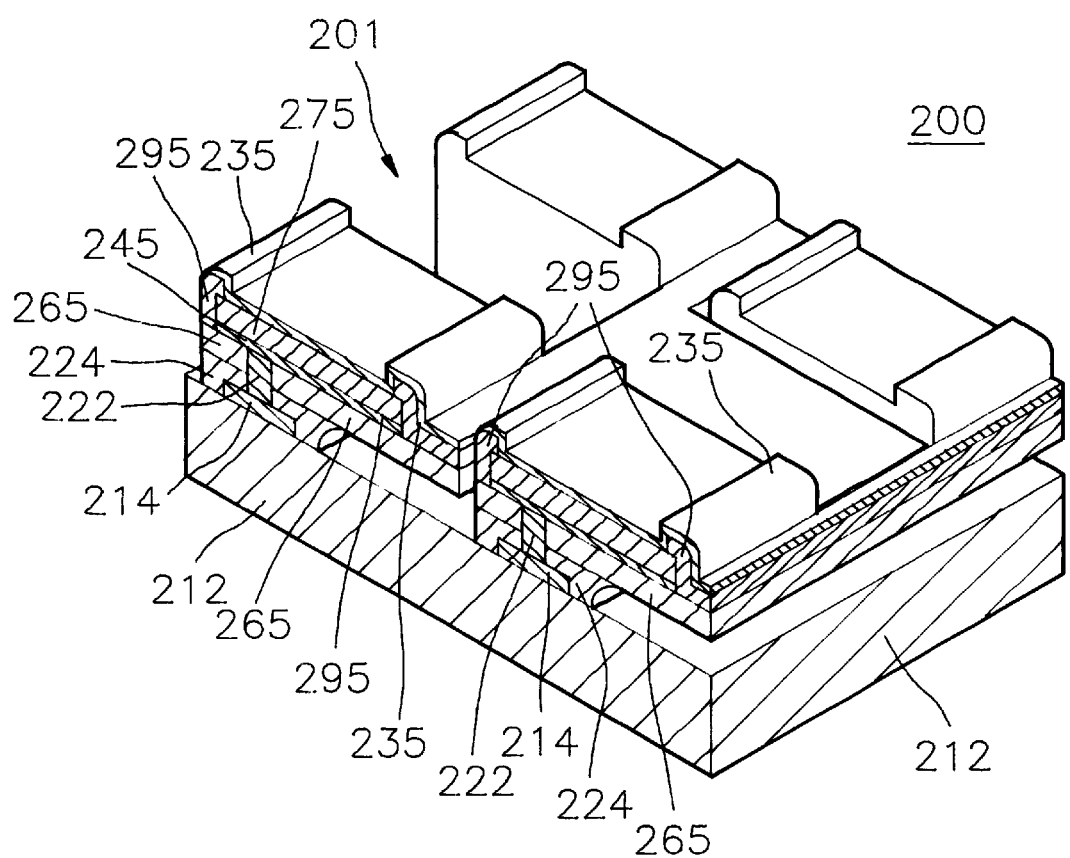
FIG. 4 shows a perspective view of one example of the array of M×N thin film actuated mirrors prepared using the inventive method.

There is shown in FIG. 4 a perspective view of one example of the array 200 of thin film actuated mirrors 201 prepared using the inventive method.

While the present invention has been described with respect to certain preferred embodiments only, other modifications and variations may be made without departing from the scope of the present invention as set forth in the following claims.

What is claimed is:

1. A method for manufacturing an array of M×N thin film actuated mirrors on a substrate including an array of M×N connecting terminals, wherein M and N are integers, for use in an optical projection system, and each of the thin film actuated mirrors has an unimorph structure, the method comprising the steps of:

forming a thin film sacrificial layer on top of the substrate;

creating an array of empty slots in the thin film sacrificial layer, wherein each of the empty slots exposes each of the connecting terminals, and the creation of the empty slots gives rise to sharp edges at a boundary between the thin film sacrificial layer and each of the empty slots;

rounding off the sharp edges;

forming a supporting member in each of the empty slots;

depositing an elastic layer on top of the supporting members and the thin film sacrificial layer;

forming an appropriate number of conduits, each of the conduits extending from top of the elastic layer to top of the corresponding connecting terminal;

forming a second thin film layer and a thin film electrodisplacive layer, successively, on top of the elastic layer and the conduits;

patterning the thin film electrodisplacive layer and the second thin film layer, respectively, into an array of M×N thin film electrodisplacive members and second thin film electrodes so that each of the thin film electrodisplacive members and the second thin film electrodes are formed on top of the supporting members with the elastic layer intervening therebetween, wherein each of the thin film electrodisplacive members and the second thin film electrodes has side surfaces;

patterning the elastic layer into an array of elastic member until the thin film sacrificial layer is exposed;

removing the thin film sacrificial layer to thereby form an array of M×N semifinished actuators, wherein each of the semifinished actuators is provided with a driving space; and forming a first thin film electrode on top of each of the semifinished actuators to thereby form the array of M×N thin film actuated mirrors.

2. The method of claim 1, wherein the sharp edges are rounded off by using a rapid thermal annealing method.

3. The method of claim 2, wherein the rapid thermal annealing method includes the steps of:

raising the temperature by 45°–55° C./sec. in a nitrogen gas atmosphere until a desired temperature is attained, the desired temperature being in a range from 1000° C. to 1500° C.;

holding the desired temperature for 30–60 seconds; and lowering the temperature by 100°–150° C./min.

4. The method of claim 1, wherein each of the thin film actuated mirrors has a bimorph structure.

5. The method of claim 4, which further comprises the steps of forming additional electrodisplacive and electrode layers.

6. The method of claim 1, which further comprises, after the step of patterning the thin film electrodisplacive layer and the second thin film layer, the steps of:

depositing an insulating layer on top of each of the thin film electrodisplacive members and the elastic layer including the side surfaces of each of the thin film electrodisplacive members and the second thin film electrodes; and patterning the insulating layer into an array of insulating members.

7. The method of claim 6, wherein the insulating layer has a thickness of 0.1–2 μm.

8. The method of claim 6, wherein the insulating layer is formed by using a sputtering or a CVD method.

9. The method of claim 6, which further comprises, after the step of removing the thin film sacrificial layer, the step of:

forming a photoresist layer on top of the array of M×N semifinished actuators, the photoresist filling in the driving spaces; and removing portions of the photoresist layer and the insulating member formed on top of the thin film electrodisplacive member in each of the semifinished actuators.

10. The method of claim 9, which further comprises, after the step of: removing portions of the photoresist layer and the insulating member formed on top of the thin film electrodisplacive member in each of the semifinished actuators, the step of:

removing portions of the photoresist layer on top of each of the insulating members and the photoresist filling in the driving spaces.

11. The method of claim 9, wherein the photoresist layer is a polymer.

12. The method of claim 9, wherein the photoresist layer has a thickness of 1–2 μm.

13. The method of claim 9, wherein the photoresist layer is formed by using a spin coating method.

14. The method of claim 10, wherein the photoresist, which fills in the driving spaces, is removed by using a plasma etching method.

15. The method of claim 10, which further comprises, after the step of removing portions of the photoresist layer formed on top of each of the insulating members and the photoresist filling in the driving spaces, the step of:

removing portions of the insulating members formed on top of each of the elastic members.

* * * * *